D. KLEIN & D. BROWN
TEAT CUP.
APPLICATION FILED AUG. 2, 1909.
954,110.
Patented Apr. 5, 1910.
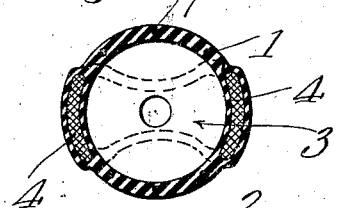
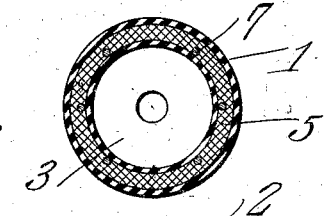
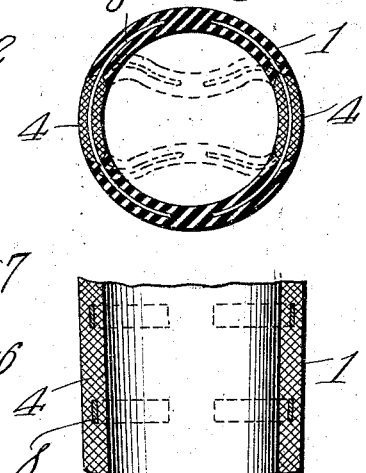
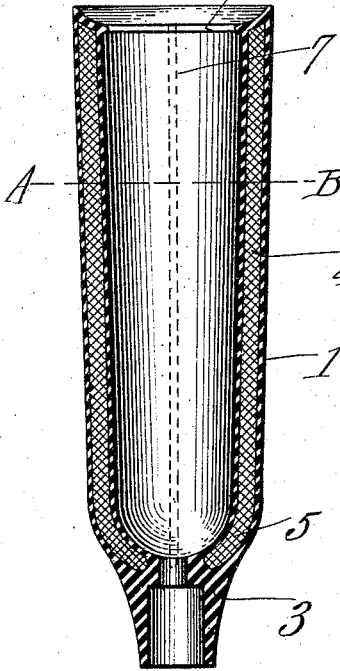
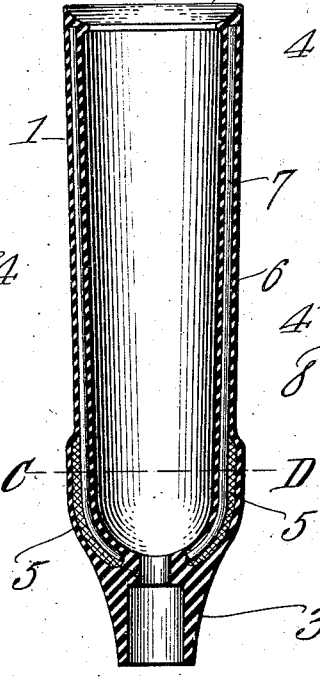
Daniel Klein
David Brown
Inventors
Witnesses
By C. A. Snow & Co.
Attorneys

UNITED STATES PATENT OFFICE.

DANIEL KLEIN AND DAVID BROWN, OF SPOKANE, WASHINGTON.

TEAT-CUP.

954,110.   Specification of Letters Patent.   Patented Apr. 5, 1910.

Application filed August 2, 1909. Serial No. 510,785.

*To all whom it may concern:*

Be it known that we, DANIEL KLEIN and DAVID BROWN, citizens of the United States, residing at Spokane, in the county of Spokane, State of Washington, have invented a new and useful Teat-Cup, of which the following is a specification.

This invention has reference to improvements in teat cups, that is, a cup adapted to receive and house the teat of a cow in such manner that milking may be performed by means of a suitable pulsator type of milking machine.

In accordance with the present invention the cup is made collapsible on two sides so that when placed in position and the alternate vacuum and atmospheric pressure is exerted, the action of the vacuum or reduced pressure will be to collapse the cup on the two sides and press against the teat in a manner similar to the action of hand-milking.

It is the object of the present invention to provide a teat cup which will facilitate the flow of milk and will also prevent any congestion of the teat as is liable to happen when cows are milked by milking machines and the cow is for any reason disposed to hold up her milk. By the structure of the present invention danger of congestion is entirely eliminated while the flow of milk is materially increased by reason of the pressure exerted on both sides of the teat.

It is customary to make teat cups of rubber, but the action of the milk is such as to ultimately destroy the elasticity of the rubber, and the present invention includes means for rendering the elasticity of the teat cup independent of the elastic nature of the rubber.

The invention will be best understood from a consideration of the following detail description taken in connection with the accompanying drawings forming a part of this specification, in which drawings Figure 1 is a central longitudinal section through a teat cup embodying the invention. Fig. 2 is a cross section on the line A—B of Fig. 1. Fig. 3 is a section through the teat cup at right angles to the section of Fig. 1. Fig. 4 is a section on the line C—D of Fig. 3. Fig. 5 is a longitudinal section of a portion of a teat cup showing a somewhat different construction than that of Figs. 1 and 3. Fig. 6 is a cross section of the teat cup shown in Fig. 5 and also illustrative of the action of the vacuum upon said teat cup.

Referring to the drawings, there is shown a cup 1 which in practice is of such size and shape as to conform to the teat of a cow. The upper or open end 2 of the cup is shaped to snugly embrace the root of the teat while the outer or discharge end of the cup indicated at 3 is formed for the escape of the milk and to receive a suitable conduit coming from the pulsator, which latter instrument may be the same as is commonly used in milking machines and therefore is not illustrated in the drawings. The body 1 is made generally of rubber of the elastic type and on opposite sides of the cup the rubber body houses longitudinal stiffening members 4.

Any suitable material may be used for the stiffening members, but in practice it is found that canvas answers the purpose since it is both stiff and light. These canvas stiffening members are embedded in the rubber body and extend from the top or open end 2 to but not through the discharge end 3, which, from the lower end of the stiffening members continues to the extreme end in the form of the pure rubber of the body portion. The stiffening members are joined near the lower end of the cup by a circumferential continuation 5 which may be in one piece with the lower ends of the stiffening members so that the collapsible sections indicated at 6 do not extend down to the discharge end 3 but terminate a short distance thereabove.

If with such a cup applied to the teat of a cow milking be attempted with an ordinary pulsator, then the collapsible sections 6 will be moved by air pressure one toward the other until they assume a position somewhat such as indicated in dotted lines in Fig. 2 thus bringing pressure to bear upon the teat of the cow from opposite sides very similar to the action of the hand of an operator in the process of hand milking. It happens, however, that rubber is more or less affected by milk and in a comparatively short time loses its natural elasticity and will no longer spring back to normal position when relieved from the action of atmospheric pressure on one side only. To overcome this trouble is one of the features of the present invention and for this purpose there is introduced into the collapsible portions o of the teat cup spring strands 7 extending from the upper end 2 to the lower end 3. These strands are embedded in the rubber of the body of the cup and also enter the reinforcement 5 about the lower end of the cup. The strands may be made of spring steel, or whale bone, or any other elastic material which will answer the purpose. The strands 7 being held in the stiffening material at the lower end of the cup vary in elasticity toward the upper end of the cup where they yield most readily and consequently the upper end of the cup adjacent to the base of the teat will first collapse under the action of the pulsator and this collapsing of the side walls of the cup is progressive toward the discharge end of the cup thus very accurately simulating the action of the hand in hand milking and resulting in an increased flow of milk without the least danger of causing congestion of the teat or any other injury to the animal.

In Figs. 1 and 2 the elastic strands 7 are indicated as in the form of wires, but it will be understood that flat bands may also be used for the same purpose. Such bands may run longitudinally of the cup the same as the wires 7, or they may run transversely of the cup in which case each band will include not more than and usually less than one half the circumference of the cup at the point where the band is applied. Such bands are indicated at 8 in Fig. 5 where, in connection with the showing of Fig. 6 it will be seen that the bands traverse the reinforcing members 4 and enter for a distance into the collapsible portions 6 of the cup, but the contiguous ends of the bands are not brought into direct engagement but are separated a short distance, and by making these bands thin enough to be quite elastic the collapsibility of the sections 6 will be similar to that of the structure of Figs. 1 and 3, while the gradations of flexibility may readily be accomplished by making the bands at the upper end of the cup more flexible than those at the lower end so that the upper end of the cup will collapse first and this collapsing will progress downward as the pressure within the cup is decreased by the action of the pulsator.

The invention is not limited to the exact arrangement of springs shown and described since such arrangement of the springs and the number of the latter may be variously modified so long as the salient features of the invention are retained.

It will be seen from the showing of Figs. 1 to 4 that the spring members there shown, whether consisting of wires or strips, extend longitudinally through the collapsible portions without connection to the stiffening members except at the lower end, and these elastic members incorporated in the rubber wall, serve to impart elasticity to the collapsible portions even after the inherent elasticity of the rubber has been lost.

In the structure shown in Figs. 5 and 6 the elastic members traverse the reinforcing members and extend for a distance on each side thereof into the collapsible portion of the body of the cup, and these elastic members are either made up of a number of separated pieces, or may be made in one continuous piece on each side of the cup traversing the stiffening member there located and extending from each edge thereof for a distance into the collapsible members of the cup.

What is claimed is:

1. A teat cup having a stiffening reinforce on opposite sides and elastic members embedded in the walls of the cup between the reinforcing members.

2. A teat cup having readily yieldable teat compressing areas with the remaining portion of the wall of the cup less yieldable, and elastic members embedded in the more yieldable areas.

3. A teat cup the wall of which has portions of variable flexibility, the more readily yieldable portions having elastic members embedded therein.

4. A rubber teat cup having a reinforce embedded in the wall thereof on opposite sides of said wall, the reinforce being of less area than the wall of the cup, and elastic members embedded in the wall of the cup between the reinforcing members.

5. A teat cup having relatively non-compressible areas and more readily compressible areas, the latter including elastic members of different characters.

6. A teat cup of elastic material with a circumferential reinforce near the discharge end and oppositely disposed reinforcing members extending from said circumferential reinforce toward the other end of the body of the teat cup, and elastic members embedded in the portions of the body of the teat cup between the longitudinal reinforcing members.

7. A teat cup having a body portion with areas of different degrees of flexibility, the more readily yieldable areas having elastic members embedded therein.

8. A teat cup provided with a stiffening reinforce and areas of greater flexibility than the reinforced areas and elastic members embedded in the reinforce and extending into the more readily yieldable areas.

In testimony that we claim the foregoing as our own, we have hereto affixed our signatures in the presence of two witnesses.

DANIEL KLEIN.
DAVID BROWN.

Witnesses:
A. C. WELD.
K. E. DAVIS.